US 6,578,523 B2

(12) United States Patent
Gagnon

(10) Patent No.: US 6,578,523 B2
(45) Date of Patent: Jun. 17, 2003

(54) MUSSEL CULTIVATION DEVICE

(76) Inventor: Gilles Gagnon, 185 Arthur Ouimet, Terrebonne, Quebec (CA), J6Y 1G8

( * ) Notice: Subject to any disclaimer, the term of this patent is extended or adjusted under 35 U.S.C. 154(b) by 0 days.

(21) Appl. No.: 10/096,880

(22) Filed: Mar. 14, 2002

(65) Prior Publication Data

US 2002/0129772 A1 Sep. 19, 2002

Related U.S. Application Data

(60) Provisional application No. 60/276,142, filed on Mar. 16, 2001.

(51) Int. Cl.$^7$ .............................................. A01K 61/00
(52) U.S. Cl. ....................... 119/234; 119/237; 119/236
(58) Field of Search .................. 119/237, 236, 119/234, 238, 239, 241

(56) References Cited

U.S. PATENT DOCUMENTS

| 3,675,626 A | * | 7/1972 | Down ........................ 119/238 |
| 3,741,159 A | * | 6/1973 | Halaunbrenner ............ 119/240 |
| 3,853,095 A | * | 12/1974 | Lawrence ................... 119/238 |
| 3,870,019 A | * | 3/1975 | McNicol ..................... 119/241 |
| 4,377,987 A | * | 3/1983 | Satre .......................... 119/241 |
| 4,766,846 A | * | 8/1988 | Lavoie ........................ 119/240 |
| 5,515,813 A | * | 5/1996 | Wilkerson ................... 119/223 |
| 6,230,646 B1 | * | 5/2001 | Berry et al. ................ 114/293 |

FOREIGN PATENT DOCUMENTS

| FR | 2627054 A1 | * | 8/1989 | .......... A01K/61/00 |
| GB | 2144780 A | * | 3/1985 | ............ D07B/1/00 |

* cited by examiner

Primary Examiner—Michael J. Carone
Assistant Examiner—Andrea Valenti
(74) Attorney, Agent, or Firm—George A. Seaby

(57) ABSTRACT

Mussels are commonly grown on ropes which have been seeded with immature molluscs. Past techniques for farming mussels have suffered from low product yields because of the low surface area of a mussel rope, and mussel detachment from the rope. Existing devices for solving these problems are cumbersome and difficult to use. The present invention solves the problems by providing a mussel farming device including a planar body with a slot in one side thereof for receiving a rope or mesh bag, an aperture at the center of the body, and a clip in the aperture for attaching the body to the rope or bag. A plurality of such devices are attached to a rope or bag at intervals along its length, thereby providing a large surface area for mussel attachment and creating stable platforms on which the mussels can mature.

9 Claims, 11 Drawing Sheets

US 6,578,523 B2

MUSSEL CULTIVATION DEVICE

This appln. claims benefit of Prov. No. 60/276,142 filed Mar. 16, 2001.

BACKGROUND OF THE INVENTION

1. Field of the Invention

This invention relates to a device for the aquatic farming of molluscs and in particular mussels.

Historically, like other marine life, mussels have been harvested from the wild, but diminishing stocks, greater demand and the need for a high quality produce have resulted in the growth of a mussel aquaculture industry.

2. Discussion of the Prior Art

Existing mollusc farming devices include a cage-like enclosure with a series of trays, which are seeded with immature molluscs. The enclosure is lowered into the water and left in place until the molluscs mature.

A much simpler and less expensive method of forming mussels is to seed a weighted rope, which is lowered into the water. The mussels remain attached to the rope as they develop, and are easily harvested by winching up the rope and feeding it through a device for stripping the mussels from the rope. This approach to mussel farming suffers from two serious drawbacks: firstly, mussels are sensitive to changes in water temperature and may detach from the rope if the temperature varies too much over the growing season, and secondly, the small surface area of a rope limits the number of mussels which can be grown on one rope. A device that solves both of these problems would significantly increase the yield and result in a positive economic benefit.

One attempt to increase the yield of a mussel farming rope is disclosed by Canadian Patent Application 2,130,999 (Hitchins et al) published on Sep. 2, 1993. The inventors propose a funnel-shaped, mesh net to be placed at discrete intervals along a rope to provide support and habitat for the mussels. Several obvious problems are anticipated with the use of such a net, including difficulty in attaching the nets to the rope, and the strong likelihood of entanglements.

GENERAL DESCRIPTION OF THE INVENTION

An object of the present invention is to provide a device to be used with the rope method of farming mussels which will increase crop yields by providing a greater surface area for attachment and growth of the mussels.

Another object of the invention is to provide a device that will reduce the loss of mussels by detachment from the mussel rope due to water temperature.

A further object of the invention is to provide a device, which is easy to use and to attach to a mussel farming rope.

Accordingly, the invention relates to a mollusc aquaculture device comprising a planar body; an aperture in said body for receiving a rope and a clip in said aperture connected to said body for securing the body at a fixed location on the rope whereby a rope can be inserted through the body into engagement with the clip to affix the body to the rope.

BRIEF DESCRIPTION OF THE DRAWINGS

The invention is described hereinafter in greater detail with reference to the accompanying drawings, which illustrate preferred embodiments of the invention, and wherein.

DESCRIPTION OF THE PREFERRED EMBODIMENT

Figure 1:
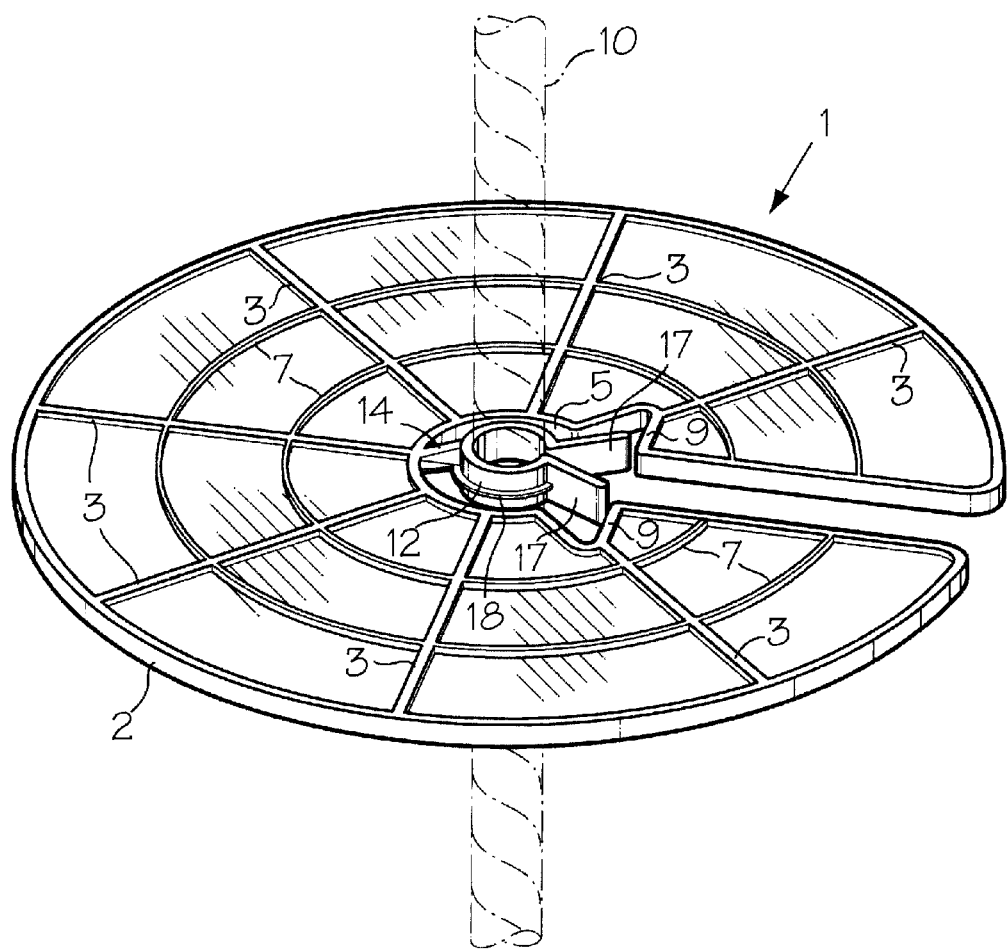
FIG. 1 is a perspective view from above of an aquacultural device in accordance with the invention.
Figure 2:
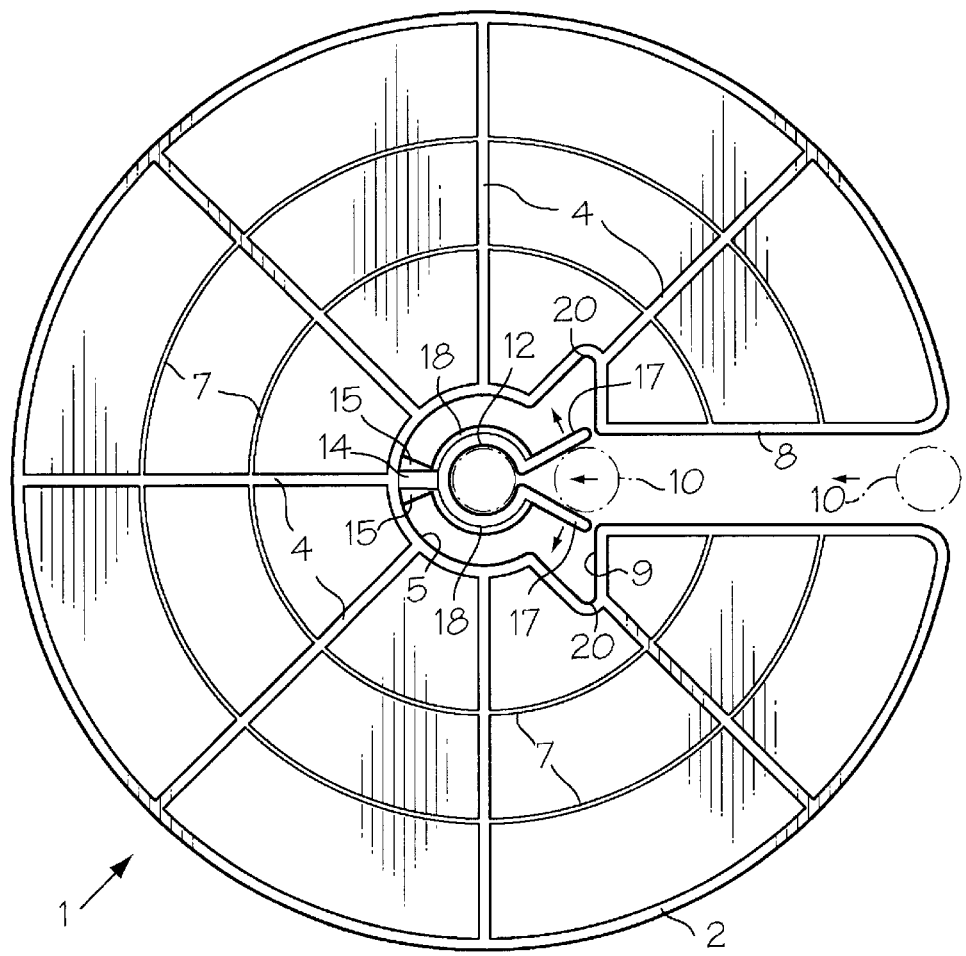
FIG. 2 is a bottom view of the aquaculture device of FIG. 1.
Figure 3:
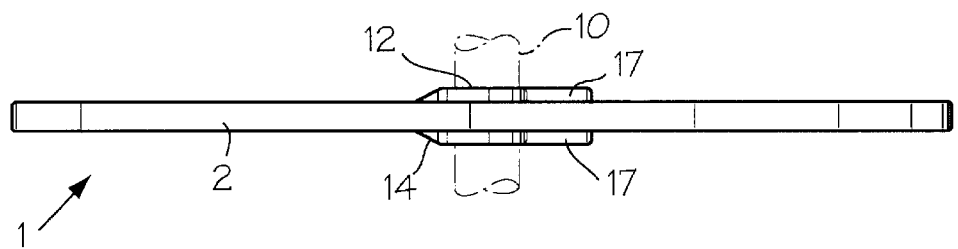
FIG. 3 is a side view of the aquaculture device of FIGS. 1 and 2.

Referring to FIGS. 1 to 3, a first embodiment of the aquacultural device includes a disc-shaped, planar body generally indicated at 1, which is reinforced by a flange 2, which extends upwardly and downwardly from the periphery of the body 1. The body 1 is further reinforced by top and bottom ribs 3 and 4, respectively extending radially between the flanges 2 and the sides of a generally bell-shaped aperture 5 in the center of the body 1. Additional, arcuate reinforcing ribs 7 (FIG. 2) are provided on both the top and bottom of the body 1. A slot 8 extends between the outer periphery of the body 1 and a straight end 9 of the aperture 5, so that a rope 10 (FIG. 1) can be introduced into the aperture. It will be noted that the flange 2 continues along the sides of the slot 8 and around the interior of the aperture 5. A cylindrical clip 12 is provided in the aperture 5 for securing the body 1 to the rope 10. The clip 12 is slightly smaller in diameter than the rope 10 for gripping the latter.

As best shown in FIG. 3, the clip 12 is taller than the flange 2, providing a large rope gripping surface. The clip 12 is connected to the body 1 on the side of the aperture 5 opposite the slot 8 by an arm 14, which is reinforced by gussets 15 (FIG. 2).

The side of the clip 12 facing the slot 8 includes an opening bordered by outwardly diverging, resilient arms 17, which guide the rope 10 into the clip. Reinforcing flanges 18 extend around the middle of the clip 12 from the gussets 15 to the arms 17. During insertion of a rope 10 into the clip 12, the arms 17 flex outwardly into generally V-shaped recesses 20 at the outer, slot end of the aperture 5, and then return to the rest position (FIG. 2) in which the rope is clamped in the clip.

It will be appreciated that, in its simplest form, the device of FIGS. 1 to 3 need not include a slot 8. By making the aperture containing the clip 12 sufficiently large, a rope 10 can be threaded through the body 1 and then pressed into the clip 12.

Because most embodiments of the invention have several features in common, in the following description of FIGS. 4 to 11, the same reference numerals are used to identify elements which are the same or similar to elements shown in FIGS. 1 to 3.

Figure 4:
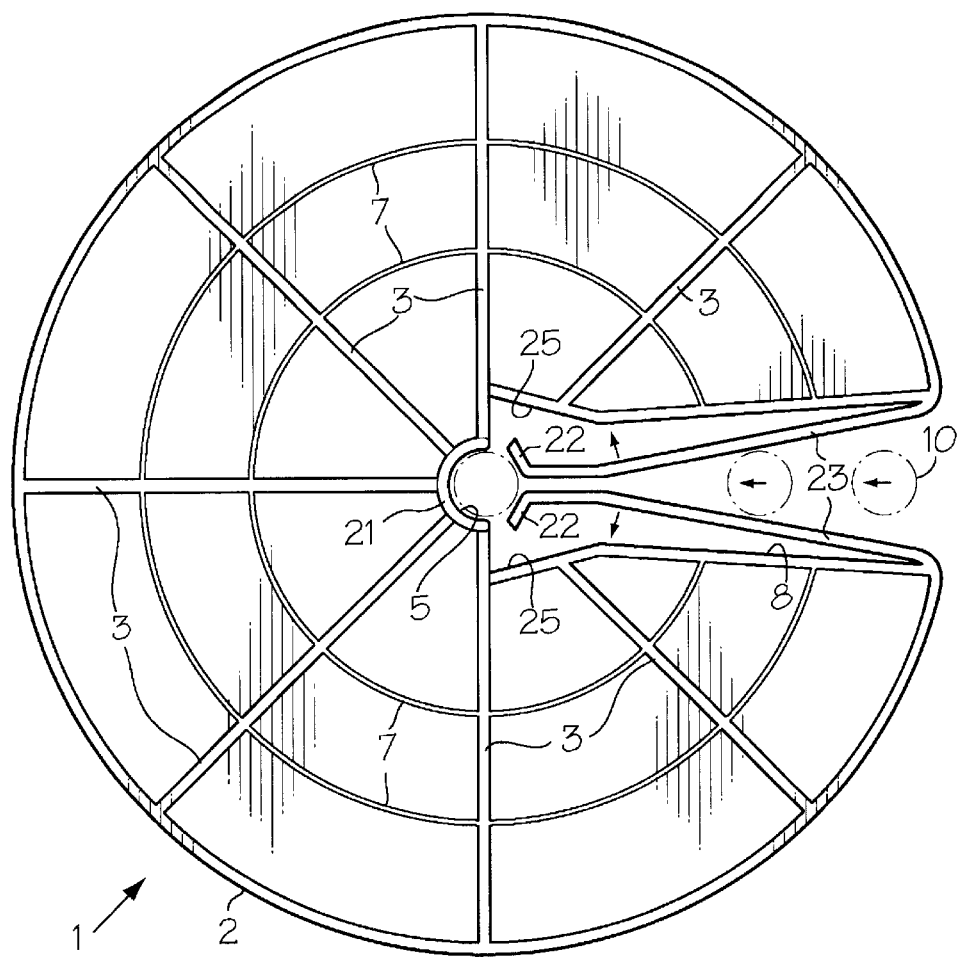
FIG. 4 is a top view of a second embodiment of the aquacultural device of the present invention.
Figure 5:
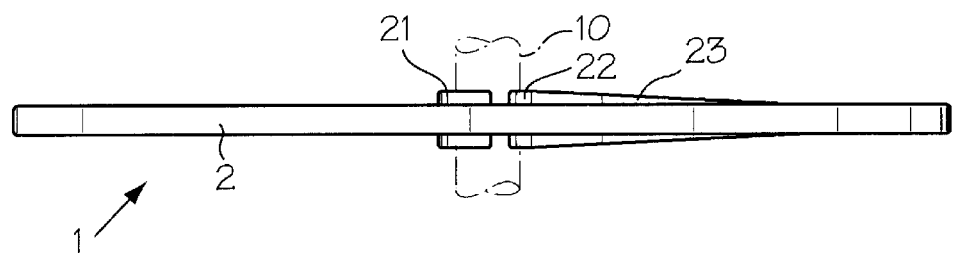
FIG. 5 is a side view of the device of FIG. 4.

Referring to FIGS. 4 and 5, in a second embodiment of the invention, the aperture 5 and the slot 8 more or less define one continuous opening in one side of the body 1. The inner end of the aperture 5 is defined by a semicylindrical wall 21, which is integral with the body 1. The outer, slot end of the clip 12 is defined by the diverging inner ends 22 of a pair of resilient arms 23. The arms 23 extend inwardly from the outer ends of the slot 8 (i.e. the sides of the outer end of the slot), converging through most of their length, and then being substantially parallel proximate their inner ends 22. The inner ends 25 of the sides of the slot 8 diverge, leaving room for the arms 23 to move apart when a rope 10 is pressed into the slot. Once the rope 10 enters the aperture 5, the arms 23 spring back to their rest positions (FIG. 4) to lock the body 1 on the rope.

Figure 6:
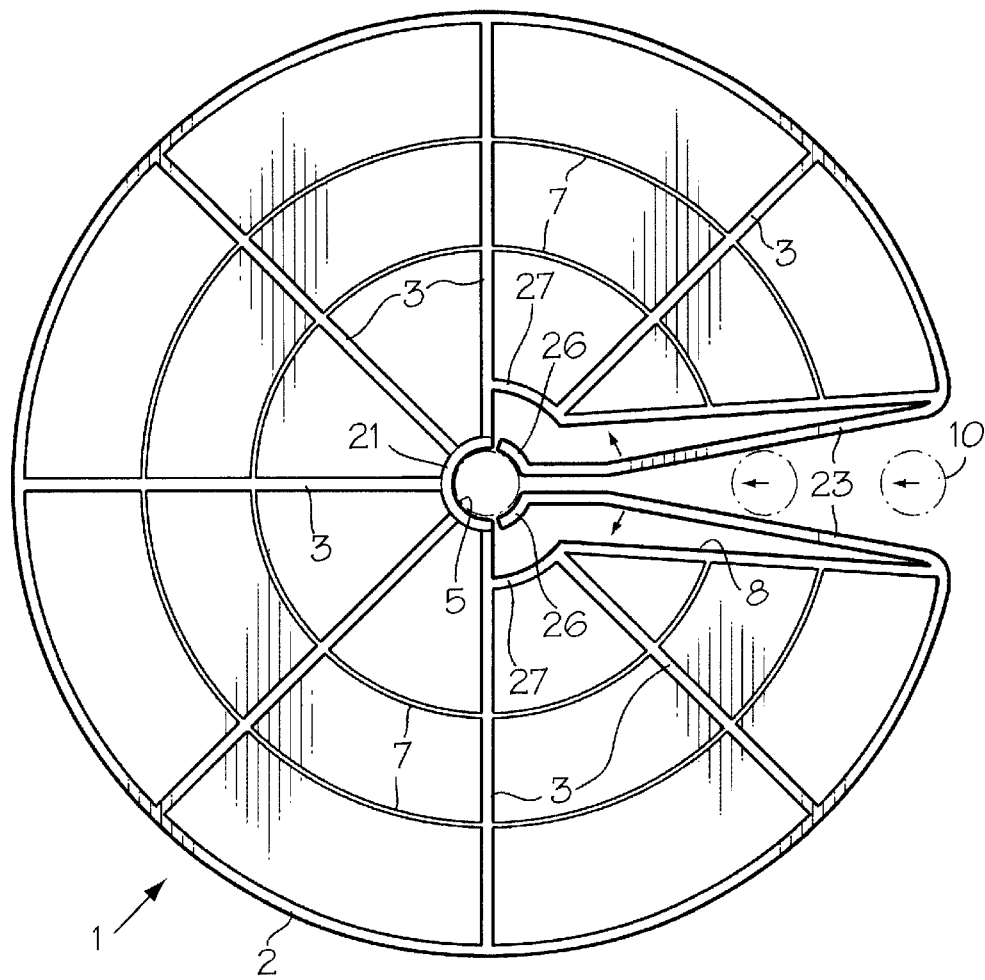
FIG. 6 is a top view of a third embodiment of the aquacultural device of the present invention.
Figure 7:
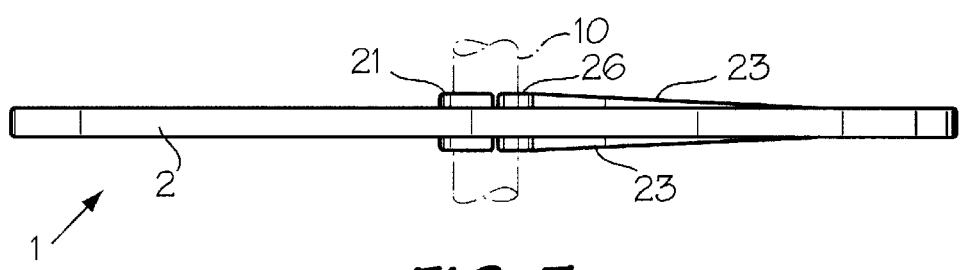
FIG. 7 is a side view of the device of FIG. 6.

The embodiment of the invention illustrated in FIGS. 6 and 7 is virtually identical to that of FIGS. 4 and 5, except that the inner ends 26 of the arms 23 and the inner ends 27 of the sides of the slot 8, respectively are arcuate.

Figure 8:
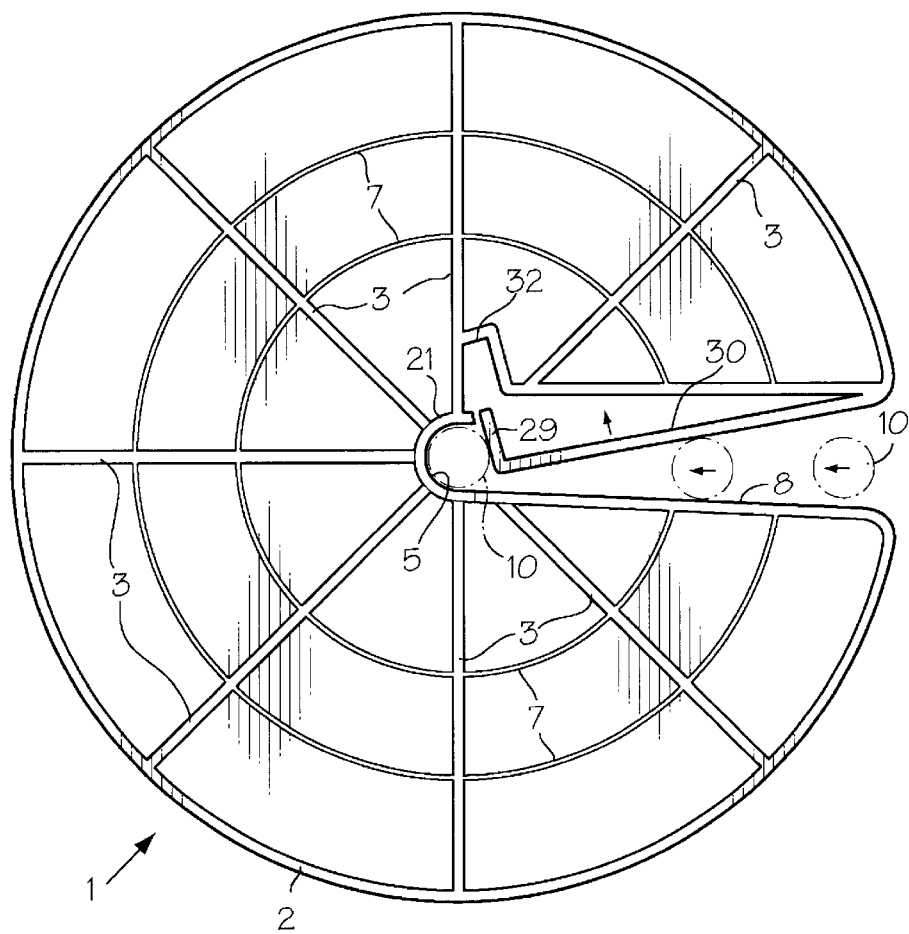
FIG. 8 is a top view of a fourth embodiment of the aquacultural device of the present invention.
Figure 9:
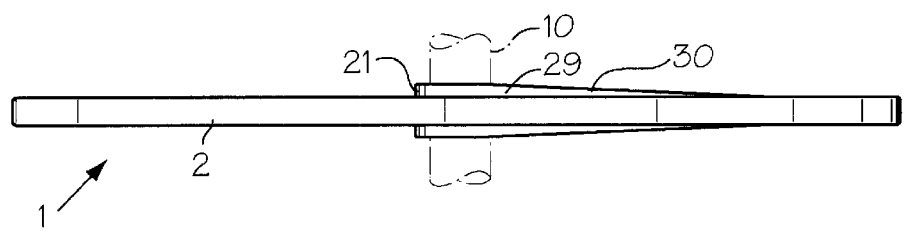
FIG. 9 is a side view of the device of FIG. 8.

With reference to FIGS. 8 and 9, in a fourth embodiment of the invention, the outer side of the clip is defined by the straight inner end 29 of a resilient, L-shaped arm 30. The arm 30 extends inwardly from one side of the outer end of the slot 8, and functions in essentially the same manner as the arms 23 (FIGS. 6 and 7) to retain a rope 10 in the aperture 5. A recess 32 in one side of the inner end of the slot 8 adjacent the aperture 5 receives the inner end 29 of the arm 30 when the latter is displaced during insertion of a rope 10 into the aperture 5. Once the rope enters the semicylindrical inner end 21 of the aperture 5, the arm 30 springs back to the rest position (FIG. 8).

In use, a plurality of the devices are placed at spaced apart locations on a rope suspended in the water. The bodies 1 provide support for immature mussels as they are growing, and reduce the risk of detachment of the molluscs from the rope.

A fifth embodiment of the invention (FIGS. 10 to 15) includes a disc-shaped body 34 defined by two semi-circular sections 35 and 36, which are joined on one side by a hinge 37 defined by a thin area of the flange 2. The flange 2 continues around the periphery of each section 35 and 36. A plurality of pins or spears 39 extend inwardly from the semicircular central portions 40 of the flange 2 for penetrating a mesh bag 41, whereby the disc is securely attached to the bag 41. A plurality of bags 41 and bodies 34 are suspended from a rope (not shown) for growing mussels.

Figure 11:
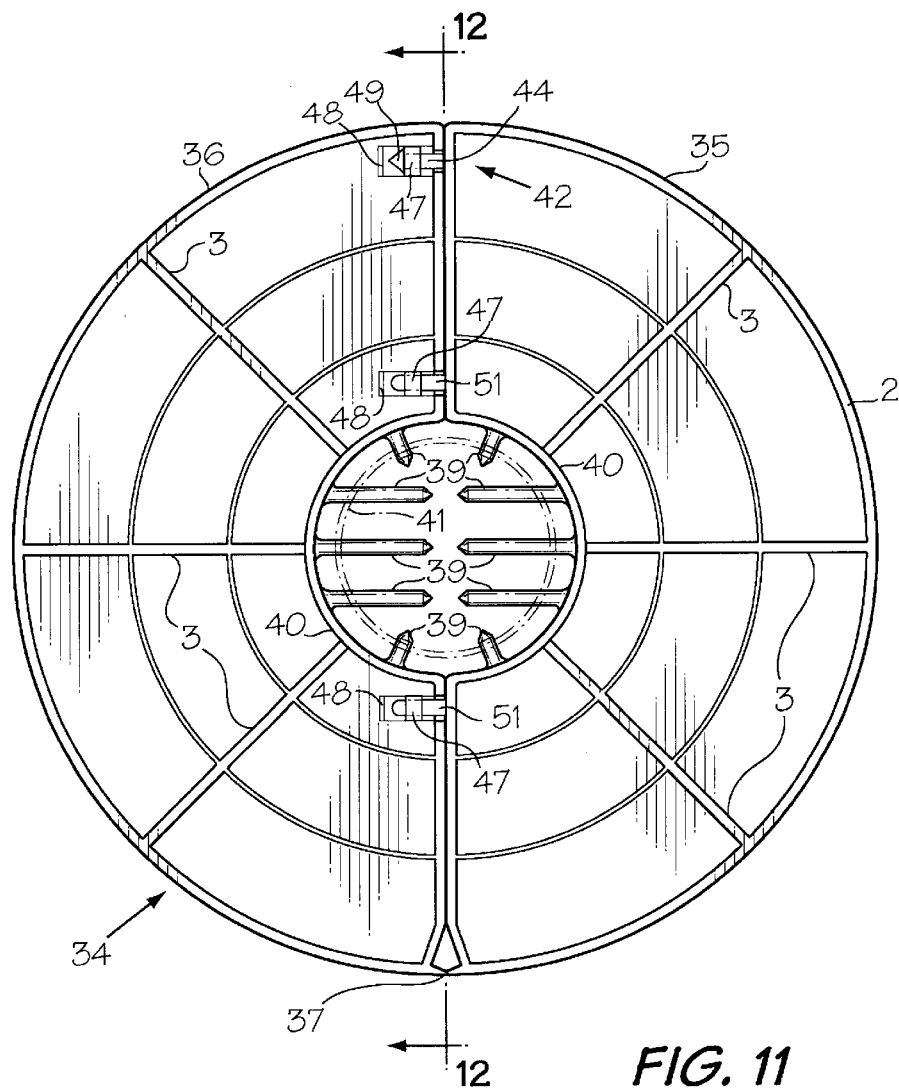
FIG. 11 is a top view of the device of FIG. 10 in the closed or use position.
Figure 13:
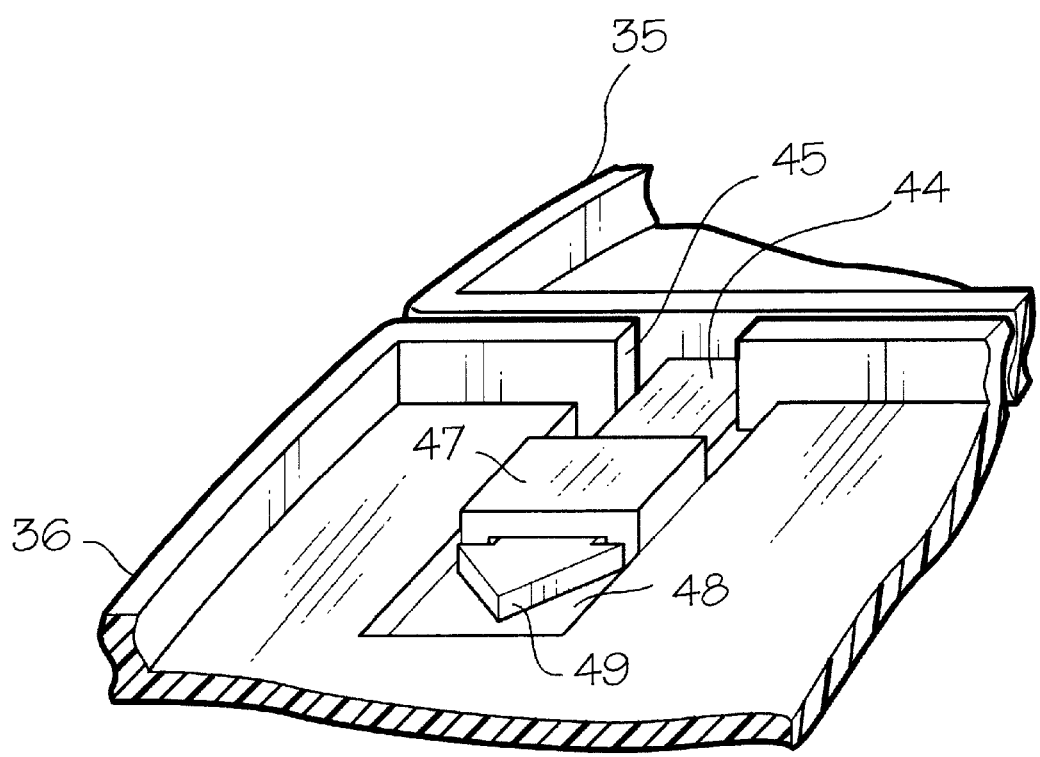
FIG. 13 is an isometric view of a latch used in the device of FIGS. 10 to 12.
Figure 14:
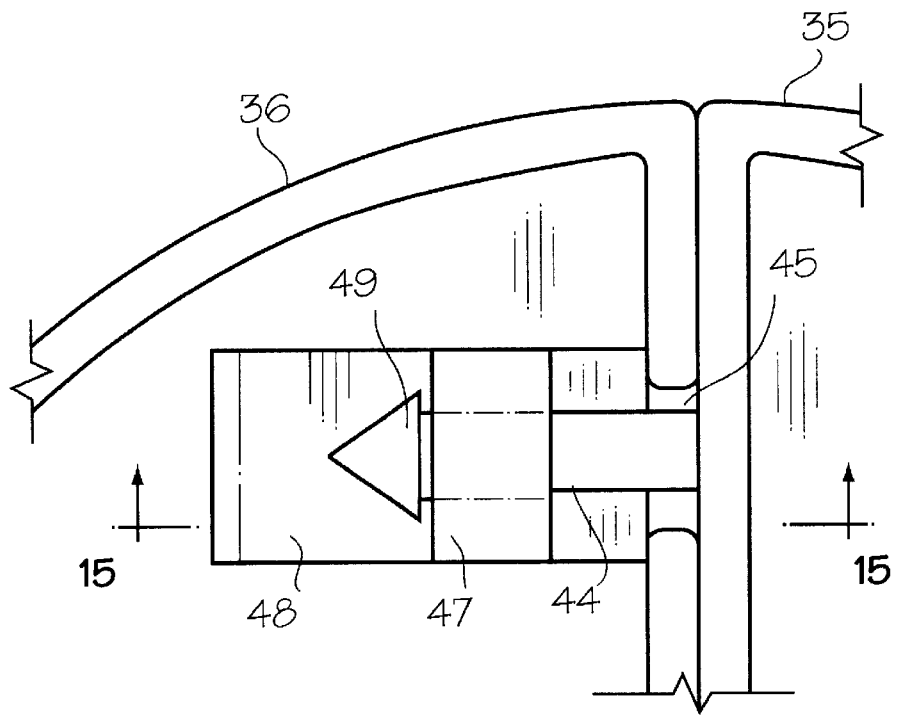
FIG. 14 is a top view of the latch of FIG. 13.
Figure 15:
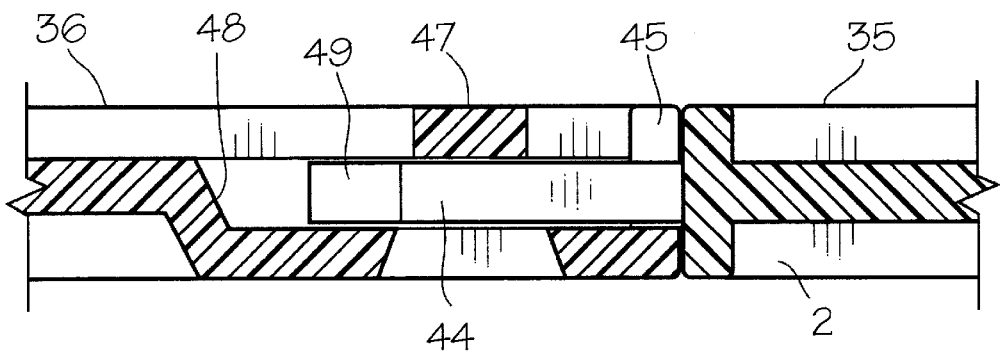
FIG. 15 is a cross section taken generally along line 15—15 of FIG. 14.

The two sections 35 and 36 of the body 34 are locked together by a latch indicated generally at 42 (FIG. 11). As best shown in FIGS. 13 to 15 the latch 42 includes a rectangular cross section, arrow-shaped bolt 44 on one section 35 of the body for sliding through a notch 45 in the other section 36 of the body 34. When the sections 35 and 36 of the body 34 are closed, the bolt 44 enters a loop 47 in a recess 48 in the section 36. During entry, the resilient head 49 of the bolt 44 is deformed, and then springs back to its original shape to lock the sections 35 and 36 together.

A pair of alignment pins 51 (FIGS. 10 and 11) also extend outwardly from the straight side of the section 35. The pins 51 are similar to the bolt 44, but do not include heads. When the sections 35 and 36 are closed, the pins 51 slide through notches 52 into loops 47 in recesses 48 in the section 36.

Figure 16:
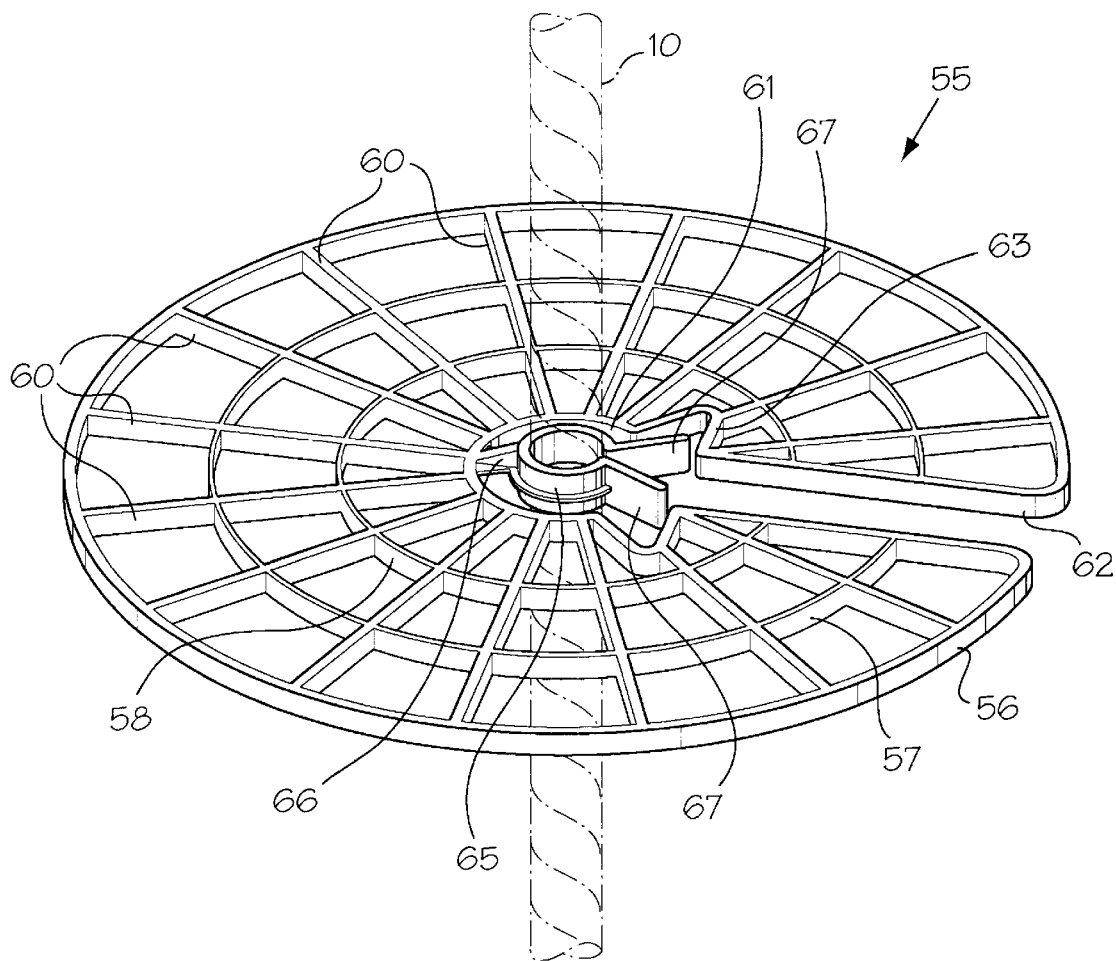
FIG. 16 is a perspective view of a sixth embodiment of the device of the present invention.

Referring to FIG. 16, a sixth embodiment of the device of the present invention, which is similar to the device of FIGS. 1 to 3, includes a hollow, circular body indicated generally at 55. The body 55 is defined by three concentric rings 56, 57 and 58 interconnected by radially extending ribs 60. The inner ends of the ribs 60 support a wall 61 defining a bell-shaped aperture similar to the aperture 5 in the body 1 (FIG. 1). A slot 62 extends between the outer ring 56 and the straight end 63 of the wall 61 for introducing a rope 10 into the central aperture.

A cylindrical clip 65 is provided in the aperture for securing the body 55 on the rope 10. The clip 65 is connected to the wall 61 by an arm 66. Access to the clip 65 is gained via an opening in one side of the wall 61, which is bordered by outwardly diverging, resilient arms 67. As in the case of the first embodiment of the invention, when a rope 10 is slid into the slot 62, the arms 67 are forced apart so that the rope enters the aperture, and then the arms return to the rest position (FIG. 16) so that the wall 61 grips the rope 10.

Figure 10:
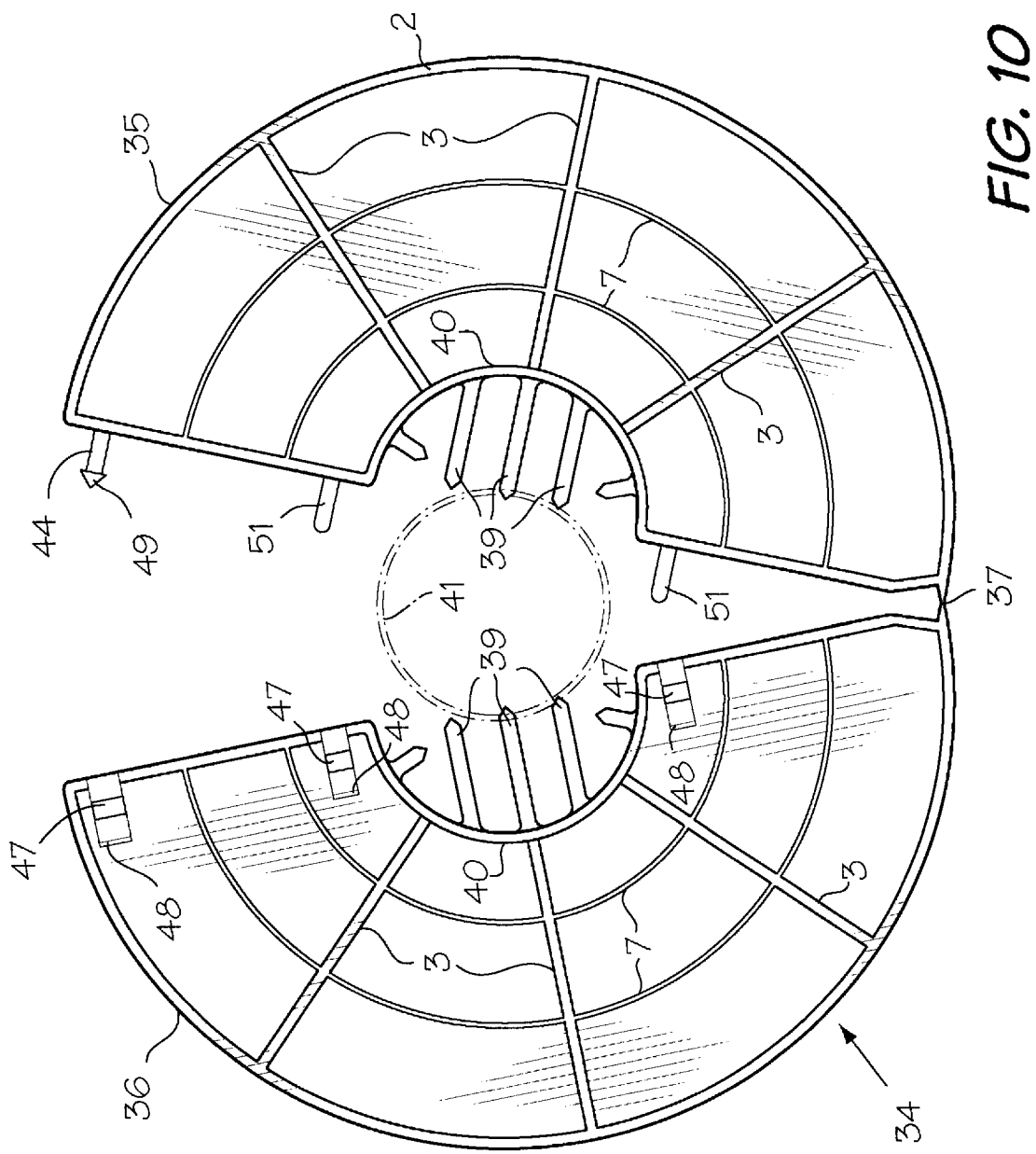
FIG. 10 is a top view of a fifth embodiment of the aquaculture device of the present invention in the open condition.
Figure 12:
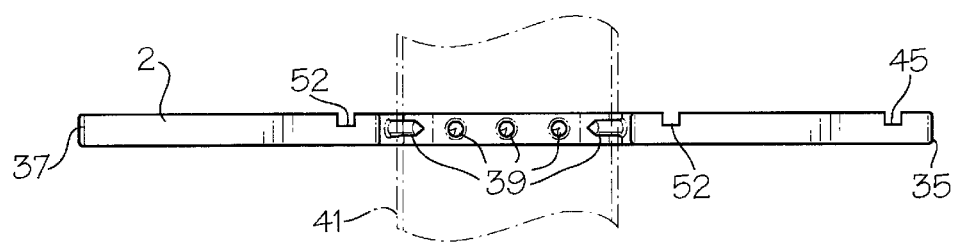
FIG. 12 is a cross section taken generally along line 12—12 of FIG. 10.
Figure 18:
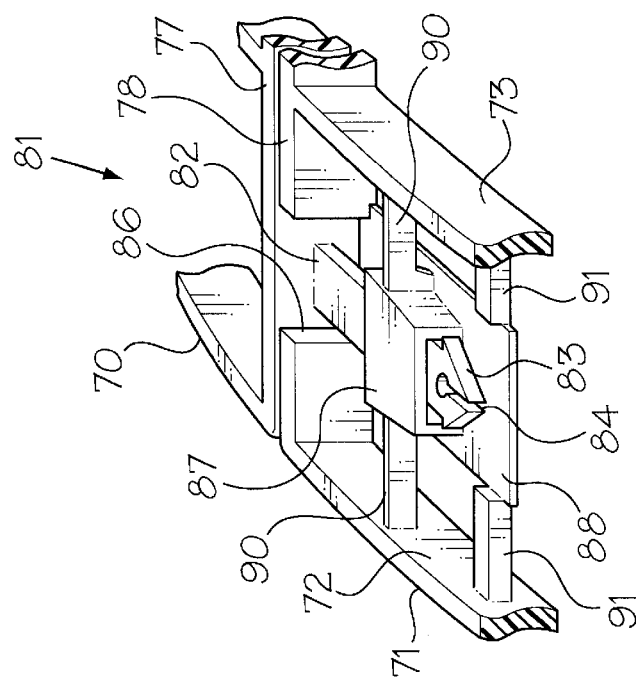
FIG. 18 is an isometric view of a latch used in the device of FIG. 17.
Figure 17:
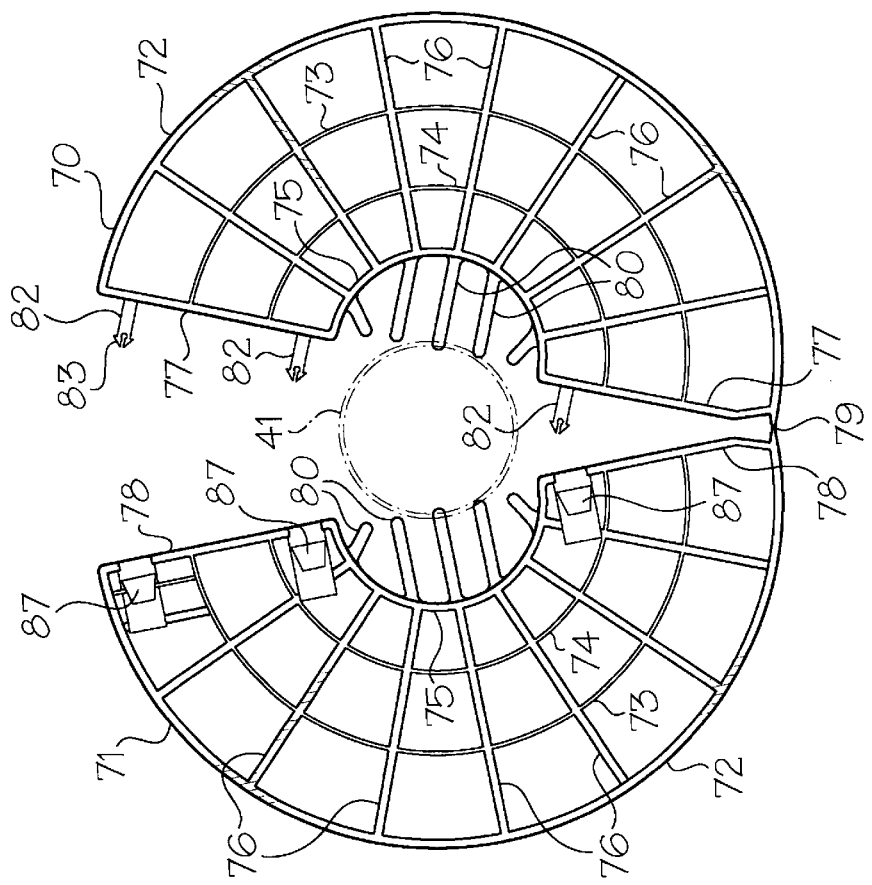
FIG. 17 is a top view of a seventh embodiment of the device of the present invention.

The embodiment of the invention shown in FIGS. 17 and 18 is similar to that of FIGS. 10 to 12, except that the two sections 70 and 71 of the body are hollow, i.e. they are defined by concentric, semicircular bars 72, 73, 74 and 75 interconnected by a plurality of radially extending ribs 76, and straight inner walls 77 and 78 which abut when the body is closed. The sections 70 and 71 are interconnected by a thin hinge 79. Pins or spears 80 extend inwardly from the semicircular central areas of the walls 77 and 78 for penetrating a mesh bag 41, whereby the body is securely attached to the bag.

The two sections 70 and 71 are locked together in the closed position by three similar latches indicated generally at 81 (FIG. 18). Each latch 81 includes an arrow-shaped bolt 82 extending outwardly form the inner wall 77 of the body section 70. The head 83 of the bolt 82 includes a longitudinally extending notch 84 in the free end thereof, facilitating flexing of the head during insertion of the head through a notch 86 in the inner wall 78 of the body section 71, and through a tapering loop or sleeve 87 on the section 71.

Referring to FIG. 18, the outermost loop 87 projects upwardly from a plate 88, which extends from the bottom of the wall 78. Ribs 90 and 91 extend between the bars 72 and 73, and the sleeve 87 and the plate 88, respectively.

The last embodiment of the invention is used in the same manner as the embodiment shown in FIGS. 10 and 11. The sections 70 and 71 are locked together so that the spears 80 penetrate a mesh bag 41. The spears 80 can also be used to penetrate a rope for holding the body on a rope. A plurality of bodies are mounted on a bag 41 in this manner, and a plurality of bags are suspended at spaced apart locations from a rope for supporting molluscs.

I claim:

1. A mollusc aquaculture device comprising:

a planar, disc-shaped body for supporting molluscs;

an aperture in the center of said body for receiving a rope;

a slot extending inwardly from a side edge of said body to said aperture for introducing a rope into said aperture;

a reinforcing flange on the periphery of said body, aperture and slot, said flange defining an outer edge of said body and the sides of said slot and said aperture and projecting above and below said body; and a clip in said aperture connected to said body for securing the body at a fixed location on a rope, whereby a rope can be inserted through the body and into engagement with the clip to affix the body to the rope.

2. The device of claim 1, wherein said body includes a plurality of arcuate and radially extending reinforcing ribs.

3. The device of claim 1, wherein said clip is cylindrical, and includes an opening facing said slot for receiving a rope, and outwardly diverging, resilient arms bordering said opening and extending towards said slot, whereby, when a rope is being inserted into said aperture, the arms flex outwardly permitting entry of a rope into the aperture, and then return to a rest position in which the rope is gripped by the clip.

4. The device of claim 1, wherein said body includes two semicircular sections; and a hinge interconnecting said sections at one side thereof.

5. The device of claim 4, wherein each section of the body includes a semicircular outer side and a straight inner side; a central concave recess in the inner side; and outwardly extending spikes in the recess for connecting the body to a rope or bag when the sections are in a closed position with the straight sides abutting.

6. The device of claim 5, including at least one latch for locking said sections in the closed position.

7. The device of claim 6, wherein said latch includes a bolt on one said section of the body, and a loop on the other said section of the body for receiving and retaining the bolt.

8. The device of claim 1, wherein said clip includes a pair of opposed resilient arms extending into said slot from the side edge of the body, said arms having inner free ends in said aperture for engaging and retaining a rope in the aperture.

9. The devise of claim 1, wherein said clip includes a resilient arm extending into said slot from the side edge of the body, said arm having an inner free end for engaging and retaining a rope in the aperture.

* * * * *